United States Patent [19]

Austin

[11] 3,878,366

[45] Apr. 15, 1975

[54] PERFORATED TAPE READOUT SYSTEMS

[75] Inventor: James E. D. Austin, Southbridge, Mass.

[73] Assignee: Data General Corporation, Southboro, Mass.

[22] Filed: May 24, 1974

[21] Appl. No.: 472,972

Related U.S. Application Data

[63] Continuation of Ser. No. 297,051, Oct. 12, 1972, abandoned.

[52] U.S. Cl. ..... 235/61.11 E; 226/39; 235/61.11 R; 360/90

[51] Int. Cl. ..................... B65h 23/18; G06k 13/22; G11b 15/56; G06k 7/10

[58] Field of Search ........ 360/90, 104; 235/61.11 R, 235/61.11 E, 61.11 D, 61.12 M; 226/48, 155, 39; 179/100.2 S; 250/570; 178/6.6 FS; 346/74 MC

[56] References Cited

UNITED STATES PATENTS

| | | | |
|---|---|---|---|
| 2,862,781 | 12/1958 | Baumeister | 346/74 |
| 3,119,020 | 1/1964 | Olson | 250/570 |
| 3,136,467 | 6/1964 | Olson | 226/39 |
| 3,175,747 | 3/1965 | Comstock | 226/39 |
| 3,323,700 | 6/1967 | Epstein | 226/39 |
| 3,525,463 | 8/1970 | Gerfast | 226/48 |
| 3,586,790 | 6/1971 | Guttinger | 179/100.2 |
| 3,624,358 | 11/1971 | Bevis | 235/61.11 R |

*Primary Examiner*—Daryl W. Cook
*Assistant Examiner*—Robert M. Kilgore
*Attorney, Agent, or Firm*—Dike, Bronstein, Roberts, Cushman & Pfund

[57] ABSTRACT

Perforated tape readout system including the combination of two stations, one being a tape drive station and the other being a brake and tape readout station. The tape drive station includes a driven rotative member to engage one side of the tape, a compressible roll to urge the tape towards the driven member and magnetic means to move the compressible roll towards said drive rotative member. The brake and tape readout station includes a support member acting as pole pieces of a magnet over which the tape is drawn. A magnetizable keeper member is positioned on the support member and completes the magnetic circuit with the pole pieces when the magnet is energized to brake the tape, the keeper also supporting a portion of a tape readout assembly below the tape so that information stored on the tape may be detected.

15 Claims, 11 Drawing Figures

PERFORATED TAPE READOUT SYSTEMS

This is a continuation of application Ser. No. 297,051, filed on Oct. 12, 1972

BACKGROUND OF THE DISCLOSURE

This invention is directed to new and improved perforated tape readout systems which are more generally known in the art as paper tape readers. Perforated tape readers take many forms but in general the prior art devices performed at least three functions, namely the driving of the tape, the braking or stopping of the tape and the reading of the tape.

In some of the present day devices these three functions are accomplished at separate stations rather than being combined. Although such tape reading systems have proved adequate the separation of the reading station and braking station has led to higher than desirable error rates because repetive braking has tended to misalign the tape with respect to the reading station and its sensors.

In addition the prior art driving mechanisms have tended to require relatively large motors to drive the tape and accordingly were quite expensive to construct. Accordingly, to overcome the above mentioned disadvantages of the prior art the present invention provides a new and improved perforated tape reader. More particularly, the present invention provides a new and improved tape drive mechanism incorporating a driven shaft and an idler roll (preferably having a surface of resilient and compressible material) and a magnetically actuated means for urging the idler roll against the tape to position the tape against the driven roll.

The present invention also includes a new and improved braking and reading mechanism which has now been combined at a single station so as to reduce the skewing or misalignment problems encountered by the prior art.

In the preferred embodiment, the braking mechanism comprises a tape support having two separated legs over which the tape passses and a keeper member positionable on the tape to retain it in place against the support legs. The keeper and support both form a portion of magnetic circuit to brake the tape motion when a magnetic field is generated between the legs of the support.

The keeper also preferably functions to support a readout sensor unit in position between the support legs so as to read the tape as it passes over the support legs. In addition, the keeper and sensors may be supported by a flexure member having circuit pathways thereon and which may be made from glass epoxy having copper pathways to provide continuous circuit lines to the electronics associated with decoding the sensor output, and machined to align the sensors and provide a cantilevered flexure by which the keeper can be raised to load the paper tape media into the reading mechanism. The construction of the keeper also guides an edge of the media through the reader.

DETAILED DESCRIPTION OF THE PREFERRED AND ALTERNATE EMBODIMENTS

Figures 1, 2, 3, 4, 9:
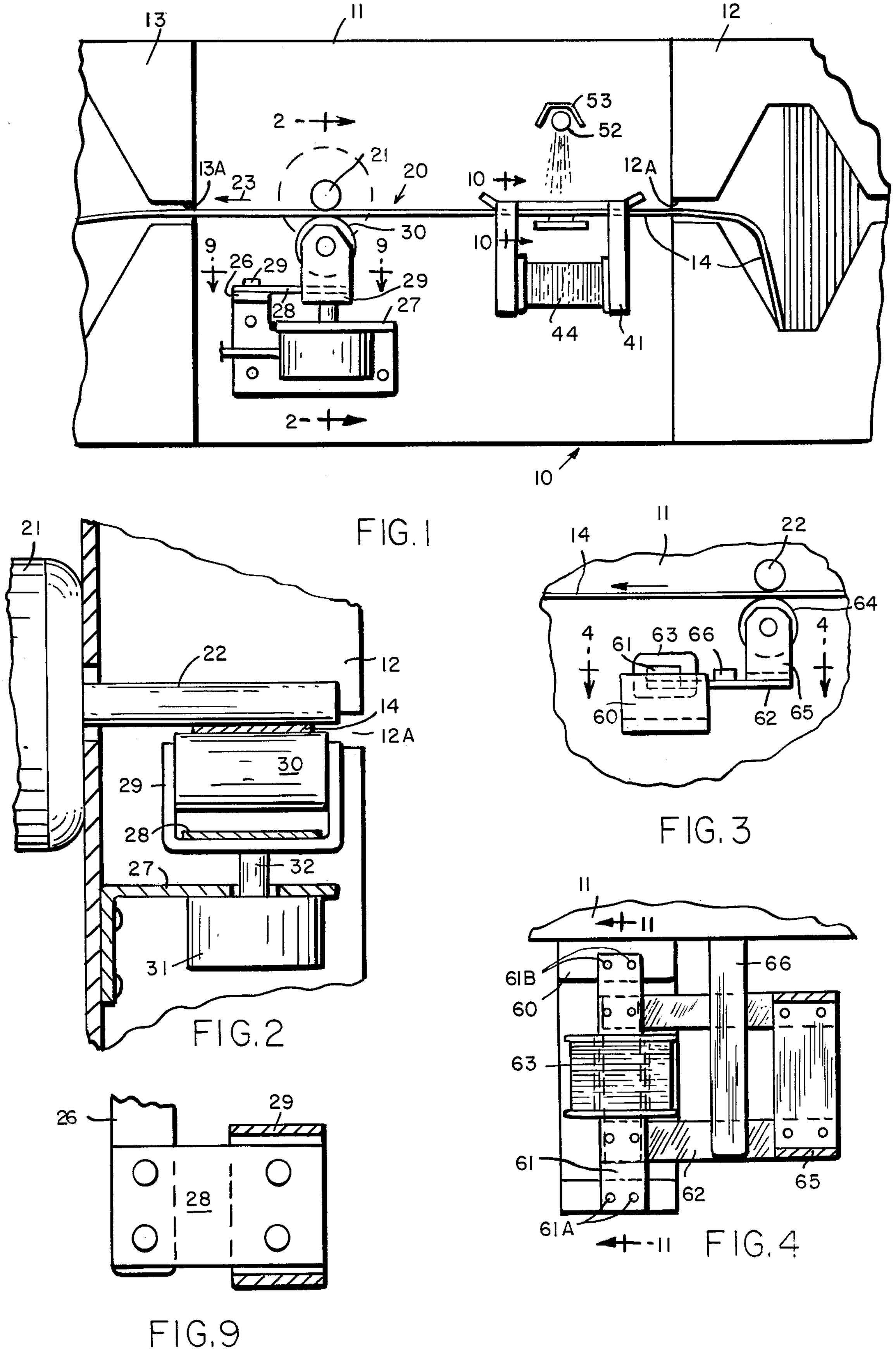
FIG. 1 is a side view of the preferred embodiment of the invention.
FIG. 2 is a sectional view taken along FIG. 2—2 of the tape drive station according to the invention.
FIG. 3 is a side view of an alternate embodiment of a tape drive station according to the invention.
FIG. 4 is a sectional view taken along line 4—4 of FIG. 3.
FIG. 9 is a sectional view taken along line 9—9 in FIG. 1.
Figure 5:
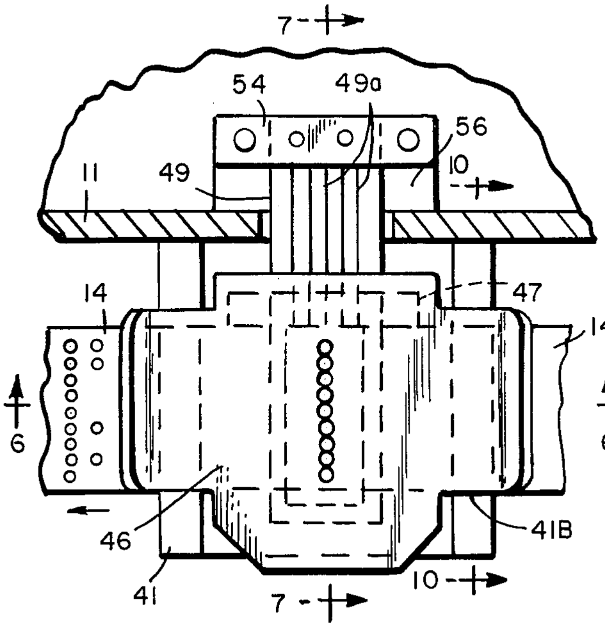
FIG. 5 is a top view of the tape braking and tape reading station of FIG. 1.
Figure 6:
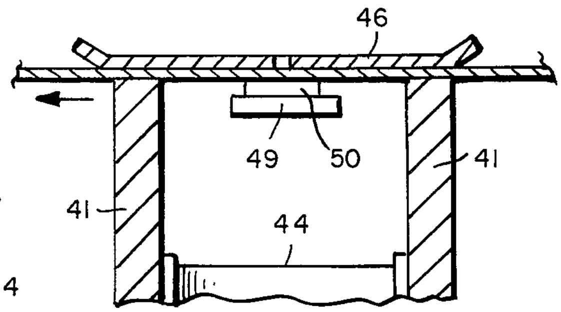
FIG. 6 is a sectional view taken along line 6—6 of FIG. 5.

Reference should now be had to FIGS. 1, 2 and 5 to 9 for a description of the preferred embodiments of the perforated tape reading system of this invention.

At 10 there is shown the system of the invention which includes a frame 11 which supports storage bins 12 and 13 from which the tape is dispensed for reading and in which the tape is stored after reading. The bins have feed slots 12A and 13A respectively for dispensing and receiving the tape.

At 14 there is shown a perforated tape or media which may be of paper, plastic etc., and which has a plurality of holes punched therethrough depending upon the data coded thereon. While the number of channels in which data may be stored on the tape is variable, in the instant case data is stored in eight channels across the width of the tape.

In order to move the tape 14 between bins 12 and 13 for reading by a reading unit to be described, there is provided a tape drive mechanism 20 located at one station of the system. The tape drive mechanism 20 comprises an electric motor 21 for rotating a steel shaft 22 (preferably having a roughened surface) which upon engagement of the tape as disclosed herein when rotating clockwise causes the tape to move to the left of FIG. 1 as shown by the arrow 23.

The motor 21 is supported by the frame 11 by bolts and the shaft 22 extends through an opening provided in the frame (see FIG. 2). At 25 there is shown a bracket mounted to the frame 11 and having first and second support members 26 and 27 extending therefrom at right angles.

Positioned on the bracket support member 26 is a member 28 secured thereto by bolts 29. The member 28 is preferably of a material such as steel which will return to its initial shape after being bent. In effect the member 28 is acting as a leaf spring.

The member 28 supports a U-shaped roll support 29 welded thereto at one end. The U-shaped support 29 has mounted therein for rotation a roll 30 preferably having a surface of a resilient material e.g., rubber. In order to urge the roll against the tape and the tape against the shaft so that the tape may be driven there is provided a magnetic solenoid 31 bolted to the member 27 and having a rod 32 extending therefrom. The rod 32 is adapted to move upwardly to push the roll 30 against the tape 14 when the solenoid is energized thus causing the tape to engage the shaft 22 and be driven thereby. When the solenoid is deenergized the rod 32 moves downwardly and the member 28 biased spring (bent counterclockwise when the rod 32 is raised) returns to its initial at rest position away from the shaft 21 and accordingly moves away rolled support 29 to no longer urge the tape 14 against the shaft 22. At this time the tape will no longer be driven by the shaft 22.

Reference should now particularly be had to the right of FIG. 1 as well as to FIGS. 4-8 and 10 for a description of the tape reading and braking station according to the invention. The braking portion of the station is supported by a nonmagnetic frame 11 by bolts (not shown) coupled to the support legs 41 of a magnetizable material e.g., iron.

The legs 41 are each provided with a step having a bottom 41A and riser or lip 41B with the riser 41B providing a guide for the front edge of the tape. The legs 41 are coupled to an iron bar 43 by screws 42 which is in turn surrounded by a coil 44. The combination of the bar 43 and the coil 44 act as an electromagnet with the legs forming the pole pieces thereof.

At 46 there is provided a keeper member of a magnetizable material e.g., iron, positioned against the risers 41B. When the coil 44 is electrically energized the keeper completes the magnetic circuit between the pole pieces (legs) and thus clamps the tape 14 at two locations against the bottom 41A of each of the legs 41 to stop it as may be seen with reference to FIG. 6.

The keeper 46 is also constructed to support a portion of the readout means of the system. In particular, the keeper 46 is provided with a rear guide 47 coupled thereto by screws which project downwardly therefrom and acts as the rear guide for the other edge of the tape 14.

The rear guide is attached to a printed circuit board 50 of a plastic insulative material which acts as a flexural member and which also supports a sensor unit 51 comprising a plurality of sensor units 51*a-i*, e.g., conventional photo detection diodes or transistors or the like, one for each of the eight data channels of the tape and one for the sprocket hole.

The sensor unit is positioned with respect to the keeper such that the tape 14 passes between the underside of the keeper and the top of the sensor unit with one edge of the tape engaging the guide 47 and the other edge of the tape engaging the riser 41B.

The circuit board 49 includes the electrical pathways 49a for coupling to the sensors and which is then brought back to a point where wires (not shown) may be joined thereto so that the data sensed by the detection of light passing through tape perforations may be processed.

In order to permit light to pass through the tape the keeper 46 is provided with a plurality of holes 46*a-i* extending therethrough which are aligned with the sensors 51*a-i* so that light from a light source 52 directed downwardly by a reflector 53 may pass through the holes and be sensed by the sensors when perforations are present in the tape channels.

The board 49 is a cantilevered flexure member preferably of plastic e.g., glass epoxy sold by Youngblood Laminates, Milbury, Mass. as Grade G10-FR4, connected to the frame 11 by a bracket 56 and a clamp 54. In this manner the keeper 46 may be raised off the legs 41 to permit the threading of the tape between the sensor units 51*a-c* and the underside of the keeper 46 (see FIG. 7).

In addition the board because of its flexure construction prevents misalignment of the tape with respect to the sensor as the tape moves up and down since both the sensors as well as the keeper will follow the tape movement.

The electrical pathways 49a may be formed by placing a copper layer on the board 49 and then etching it using conventional printed circuit techniques.

Figure 11:
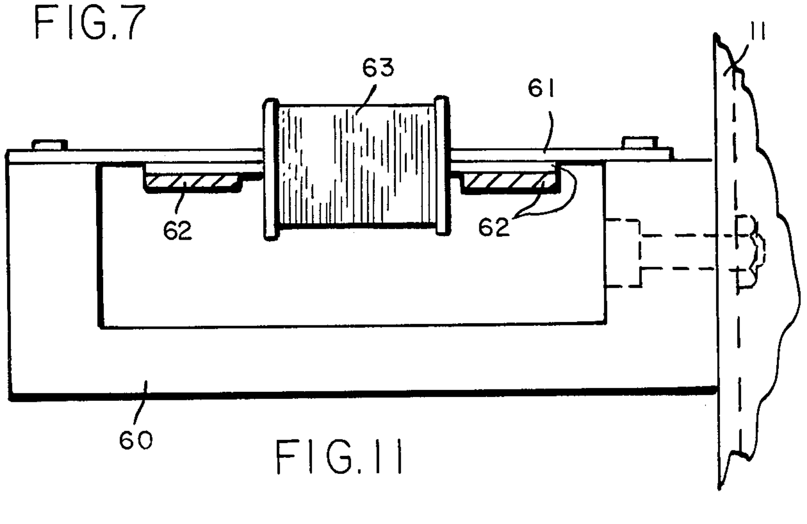
FIG. 11 is a sectional view taken along line 11—11 of FIG. 4.

Reference should now be had to FIGS. 3, 4 and 11 for a description of an alternate embodiment of a tape drive mechanism according to the invention.

In this construction the rotating shaft is again shown at 22 with the tape shown at 14 and the frame at 11. At 60 in 3, 4 and 11 there is shown a bracket extending outwardly at right angles from the frame and which supports a flexure member 61 i.e., of steel at both ends 61A and 61B. The flexure member is a member which will bend and rotate about its ends due to force causing rotation thereof and then return to its original position when the force is withdrawn.

Supported by the member 61 is a U-shaped magnetizable member 62 i.e., of iron formed of three members for convenience so that a coil 63 may be positioned thereon to form an electromagnet. In this manner the member 62 forms extensions of the pole pieces of the electromagnet.

The magnetizable members support an idler roll 64 of the type 30 previously disclosed for rotation in a bracket 65 with the bracket 65 coupled to the member 62 by screws as shown.

At 66 there is shown a latching member of a magnetizable material i.e., iron to which the member 69 may be drawn to complete the magnetic circuit between the pole pieces thereof when the coil 63 is energized.

In this manner the roller 64 may be used to urge the tape 14 against the shaft 22 to drive it through the system upon energization of the coil 63. When the coil 63 is deenergized the flexure member 61 will rotate towards its initial position carrying the member 62 and the roll 64 therewith thus disengaging the tape 14 from the drive shaft 22.

Figure 8:
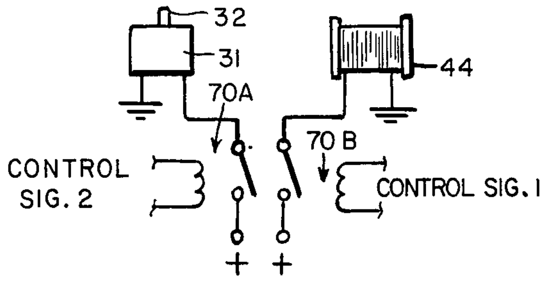
FIG. 8 is a schematic diagram of the circuitry for controlling the drive and braking of the tape through the readout system.
Figure 7:
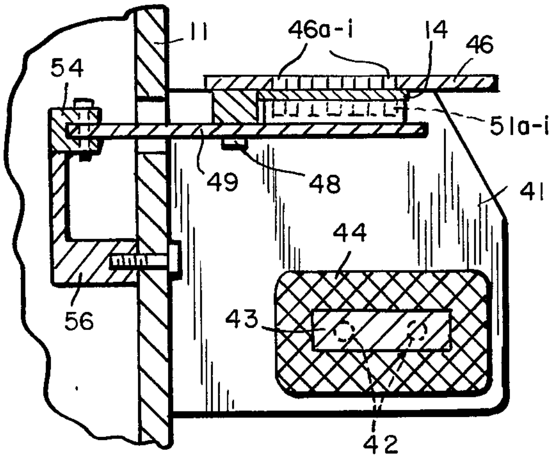
FIG. 7 is a sectional view taken along line 7—7 of FIG. 5.
Figure 10:
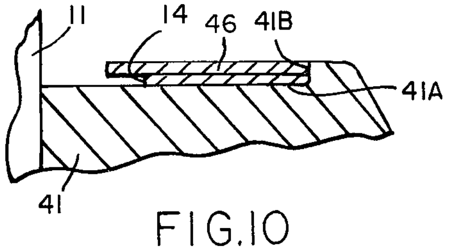
FIG. 10 is a sectional view taken along line 10—10 in FIG. 1.

In FIG. 8 there is briefly shown a conventional control for energizing the solenoid 31 (or the coil 63) to drive the tape 14 as well as to brake the tape by energizing the coil 44. by the action of control signals 1 and 2 electromagnetic switches 70A and 70B may be actuated to couple a source to the magnetic devices 31 and 44.

I claim:

1. In a tape system, means for moving a tape through the system for reading the tape, said means comprising a driven rotatable shaft, support means, a coil, first means coupled to said support means and having a magnetizable portion thereof extending through said coil, and said first means magnetizable portion constructed to bend with applied force and spring back and return to its original position in the absence of applied force, said first means supporting an idler roll for movement towards or away from said shaft, magnetizable material latching means coupled to said support means, and means for causing a current flow in said coil to cause said first means magnetizable portion to bend and to latch onto said magnetizable material latching means to complete a magnetic circuit between said first means magnetizable portion and said latching means and to also cause said idler roll to move towards said shaft in order to urge a tape into contact with said shaft, and wherein said first means comprises a first magnetizable member extending in the same direction as the axis of the coil and a pair of second magnetizable members coupled thereto on either side of the coil at an angle to the axis of the coil and forming pole extensions of said first magnetizable member, each of said second magnetizable members being bendable and having the ability to spring back to substantially their initial position, said second members supporting said idler roll and positioned to latch onto said latching means.

2. In a tape reading system: means for braking the movement of tape through the system; said braking means comprising an electromagnet coupled to magnetizable supports separated from each other and forming poles of the electromagnet; means for guiding a tape over said supports; a magnetizable material keeper member positionable for holding a tape on the supports; means for providing energy to energize the electromagnet to brake tape movement by drawing the keeper towards the supports to hold the tape against the supports; a sensor unit comprising a plurality of sensors for detecting the presence of light passing through the tape, the sensor unit fixedly secured to the keeper and positioned with respect to the keeper such that the tape will be guided therebetween, and; flexure means for supporting said keeper and sensor means.

3. In a tape reading system according to claim 2 in which tape guide means are coupled to the keeper so as to engage one edge of the tape as it passes through the brake.

4. In a tape reading system according to claim 2 in which the keeper is provided with a plurality of holes extending therethrough for permitting the passage of light towards tape passing under the keeper.

5. In a tape reading system according to claim 4 in which the keeper also supports a sensor unit comprising a plurality of sensors for detecting the presence of light passing through the tape, the sensor unit positioned with respect to the keeper such that the tape will be guided therebetween.

6. In a tape reading system according to claim 2 in which the magnetizable supports comprise two members spaced apart from each other and in which the keeper forces the tape against both supports to brake tape motion.

7. In a tape reading system according to claim 2 in which the means for guiding a tape over said supports comprises the magnetizable supports each having riser means.

8. A combined braking and reading mechanism for a perforated tape system, said mechanism comprising: an electromagnet having a pair of tape supports separated from each other and which form pole pieces thereof; a keeper means of a magnetizable material positionable to straddle said supports to retain tape passing over said supports between its underside and against said supports, and braking the tape when the electromagnet is energized; said keeper having a plurality of holes for permitting the passage and detection of light from a light source through perforated holes of a tape passing between the supports and the underside of the keeper, and; sensor means fixedly secured to said keeper and aligned with said keeper holes to intercept light passing through said keeper and perforations in a tape passing between the supports and the underside of the keeper.

9. A mechanism according to claim 8 in which sensor means are supported by said keeper to intercept light passing through said keeper and performations in a tape passing between the supports and the underside of the keeper.

10. A mechanism according to claim 9 in which the sensor means are positioned below said keeper and between said supports and is positioned so that a tape to be read passes between it and the underside of the keeper.

11. A mechanism according to claim 10 in which the support means includes guide means for one edge of the tape and the keeper supports guide means to guide the opposite tape edge.

12. In a tape reading and breaking mechanism according to claim 10 in which a flexure member means supports the keeper and sensor means, said flexure member being bendable away from the tape support means in order to thread a tape between the keeper and sensor means.

13. A combined braking and reading mechanism for a perforated tape system, said mechanism comprising an electromagnet having a pair of tape supports separated from each other and which form pole pieces thereof; a keeper means of a magnetizable material positionable to straddle said supports to retain tape passing over said supports between its underside and against said supports, and braking the tape when the electromagnet is energized; said keeper having a plurality of holes for permitting the passage and detection of light from a light source through perforated holes of a tape passing between the supports and the underside of the keeper, and; sensor means fixedly secured to said keeper and aligned with said keeper holes to intercept light passing through said keeper and perforations in a tape passing between the supports and the underside of the keeper, in which sensor means are supported by said keeper to intercept light passing through said keeper and perforations in a tape passing between the supports and the underside of the keeper in which the sensor means are positioned below said keeper and between said supports and is positioned so that a tape to be read passes between it and the underside of the keeper, in which a flexure member means supports the keeper and sensor means, said flexure member being bendable away from the tape support means in order to thread a tape between the keeper and sensor means and in which the flexure member is constructed to follow upward and downward tape movement to prevent misalignment of the tape with respect to the sensor means.

14. In a tape reading mechanism comprising: a flexure member; support means for supporting one end of the flexure member to provide a pivot therefore; sensor means supported by the flexure member, guide means supported by the flexure member in a fixed position relative to said sensor means, to guide a tape between the guide means and the sensor means, a printed electrical circuit pattern provided on the flexure member for coupling to the sensor means and means for feeding a perforated tape past said sensor means against said guide means.

15. In a tape reading and braking mechanism according to claim 8 further comprising: a printed circuit flexure means supporting said keeper and sensor means and providing for accurate electrical connection of lead wires with said sensor means.

* * * * *